(12) United States Patent
Drake

(10) Patent No.: US 8,082,698 B2
(45) Date of Patent: Dec. 27, 2011

(54) MODULAR ENCLOSURE FOR UTILITY TRAILERS AND PICKUP TRUCKS

(76) Inventor: Lawrence V. Drake, Loveland, CO (US)

(*) Notice: Subject to any disclaimer, the term of this patent is extended or adjusted under 35 U.S.C. 154(b) by 42 days.

(21) Appl. No.: 12/660,475

(22) Filed: Feb. 26, 2010

(65) Prior Publication Data
US 2011/0209418 A1 Sep. 1, 2011

(51) Int. Cl.
*E04H 1/00* (2006.01)
*E04H 14/00* (2006.01)
*E04H 3/00* (2006.01)
*E04H 5/00* (2006.01)
*E04H 6/00* (2006.01)
*E04H 9/00* (2006.01)

(52) U.S. Cl. .......... 52/79.5; 52/79.1; 296/165; 296/168; 296/173; 296/181.7

(58) Field of Classification Search ............ 52/36.1, 52/36.2, 79.1, 79.4, 79.5, 223.1, 223.3, 143, 52/204.1, 211; 296/165, 168, 173, 181.7, 296/193.03, 193.04
See application file for complete search history.

(56) References Cited

U.S. PATENT DOCUMENTS

| | | | |
|---|---|---|---|
| 2,567,516 A | 9/1951 | Jones | |
| 2,894,783 A | 7/1959 | Biird | |
| 3,574,390 A | 4/1971 | Metsker | |
| 3,652,119 A * | 3/1972 | Hall | 296/164 |
| 3,731,449 A * | 5/1973 | Kephart, Jr. | 52/631 |
| 3,830,024 A * | 8/1974 | Warnke | 52/23 |
| 4,201,413 A * | 5/1980 | Rowe | 296/165 |
| 4,468,061 A * | 8/1984 | Blake | 296/24.31 |
| 4,603,901 A | 8/1986 | McIntosh et al. | |
| 5,042,395 A | 8/1991 | Wackerle et al. | |
| 5,653,494 A | 8/1997 | Cleall et al. | |
| 5,738,747 A | 4/1998 | Blanchard | |
| 5,769,478 A * | 6/1998 | Vernese | 296/24.31 |
| 6,283,536 B1 | 9/2001 | Muzyka et al. | |
| 6,802,158 B1 * | 10/2004 | Greene | 52/79.5 |
| 7,390,052 B2 | 6/2008 | Bertoch et al. | |
| 7,488,030 B2 | 2/2009 | Nadeau | |
| 7,543,793 B2 * | 6/2009 | Graham et al. | 248/639 |
| 2005/0050808 A1 * | 3/2005 | Rosenberg | 52/79.1 |
| 2005/0235819 A1 * | 10/2005 | Long | 89/36.07 |
| 2006/0191209 A1 * | 8/2006 | Reisman | 52/36.2 |
| 2006/0260214 A1 * | 11/2006 | Tagg | 52/79.1 |
| 2007/0175108 A1 * | 8/2007 | Stein et al. | 52/79.5 |

* cited by examiner

*Primary Examiner* — Brian Glessner
*Assistant Examiner* — Brian D Mattei
(74) *Attorney, Agent, or Firm* — William E. Hein

(57) ABSTRACT

A light weight modular enclosure that may be easily assembled by a user and mounted on a utility trailer or pickup truck includes a plurality of modular foam-encapsulated side panel assemblies and two foam-encapsulated corner panel assemblies arranged in adjacent positions in U-shaped anchor channels secured along three edges of a rectangular floorboard to form a front wall and two side walls of the modular enclosure. The side panel and corner panel assemblies each include a plurality of molded key pins and key sockets that are positioned for mating engagement to secure the panel assemblies in strict alignment when adjacently positioned in the anchor channels. A door frame assembly fits into the open rear end of the modular enclosure. A pop-up canopy assembly is installed over the top of the modular enclosure to provide additional head room during use. Two lengths of a gird belt are attached to the door frame assembly, and the two free ends are routed forward within horizontal gird belt channels molded in the exterior surface of each of the side and corner panel assemblies. The free ends of the gird belt are cinchably joined at the front end of the modular enclosure to secure the side and corner panel assemblies in their assembled positions.

17 Claims, 5 Drawing Sheets

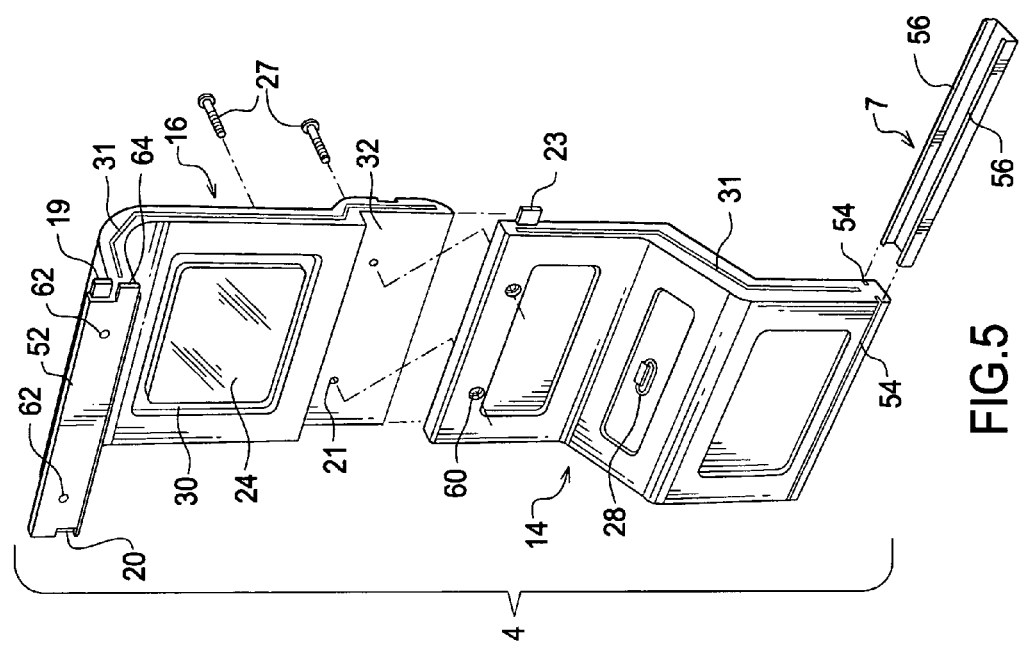
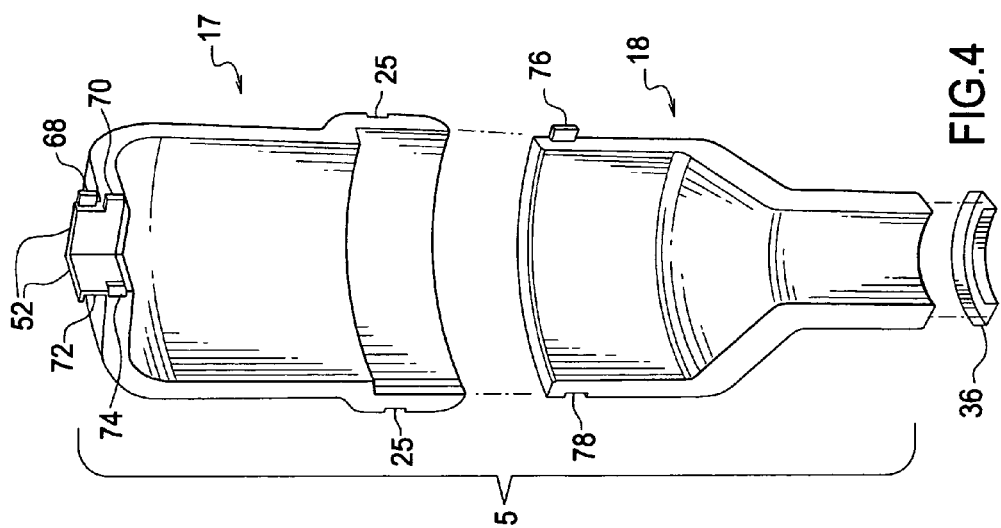

MODULAR ENCLOSURE FOR UTILITY TRAILERS AND PICKUP TRUCKS

BACKGROUND AND SUMMARY OF THE INVENTION

This invention relates generally to camper shells and, more particularly, to a modular enclosure that can be quickly installed on conventional utility trailers or the beds of pickup trucks, for example, that is lightweight and portable, is customizable to meet any size and application requirement, and is easily assembled, stored, and shipped.

Various enclosures for utility trailers, pickup truck beds, and travel trailers intended for camping, hunting, fishing, and hauling are well known in the prior art. Open utility trailers and pickup truck beds provide a mobile chassis for such enclosures. None of these prior art enclosures, however, offers strength, light weight, and versatility. For example, none of the prior art dedicated camping trailers can be easily and quickly assembled by a user for mounting on a vehicle or removed from the vehicle and disassembled for compact storage in order to be in compliance with the requirements of many cities, which prohibit storage of recreational vehicles on a residential lot, thus requiring owners to pay for expensive storage in a commercial lot.

Many prior art enclosures are factory-assembled for permanent mounting on an integrated mobile chassis. For example, U.S. Pat. No. 2,894,783 to Bird describes a towed camping trailer. U.S. Pat. No. 3,574,390 to Metsker describes a camping trailer having reinforced walls. U.S. Pat. No. 5,042,395 to Wackerle et al. describes a modular vehicle body. U.S. Pat. No. 5,769,478 to Vernese describes a method for manufacturing a horse trailer. U.S. Pat. No. 7,390,052 to Bertoch et al. describes a recreational vehicle constructed of modular components. U.S. Pat. No. 5,653,494 to Cleall et al. describes a modular trailer.

Various prior art enclosures for mounting on pickup truck beds are removable, but are difficult to handle due to their bulk and weight. U.S. Pat. No. 5,738,747 to Blanchard, for example, describes a method of manufacturing a pickup camper shell, and U.S. Pat. No. 4,603,901 to McIntosh et al. describes a pickup camper shell having a liftable top.

Other prior art enclosures utilize tubing and fabric in an attempt to make them lighter and more portable, but they lack the insulation and solid walls that are required to protect cargo or occupants. Representative of this prior art is U.S. Pat. No. 6,283,536 to Muzyka et al. which describes a folding camper system for pickup trucks.

Prior art camping trailers are generally too heavy and bulky to be efficiently towed by today's small automobiles and SUVs. Representative of the attempts to solve this problem are the collapsible trailer described in U.S. Pat. No. 2,567,516 to Jones and the teardrop travel trailer having an airfoil shape that is described in U.S. Pat. No. 7,488,030 to Nadeau. While lighter in weight so that they can be towed by small vehicles having towing capacities of less than one thousand pounds, these prior art camping trailers lack utility in other applications.

It would be advantageous to provide an enclosure for mounting on a utility trailer or pickup truck that is quickly and easily assembled by a user from modular light weight components that can be compactly packaged for storage and shipment, that is very portable, and that is adaptable in size and application.

It would be further advantageous to provide a modular enclosure that is sufficiently light weight to be towed by today's small, fuel-efficient motor vehicles.

It would be further advantageous to provide a modular enclosure that can be quickly and easily loaded onto and unloaded from a utility trailer or pickup truck, thereby preserving the cargo transport utility of the trailer, or pickup truck.

It would be further advantageous to provide a modular enclosure having a pop-up top that presents a low profile when the modular enclosure is being towed, but that allows people to stand erect inside it.

In accordance with the illustrated embodiment of the present invention, a plurality of modular foam-encapsulated side panel assemblies and two foam-encapsulated corner panel assemblies are arranged in adjacent positions in U-shaped anchor channels secured along three edges of a rectangular floorboard to form a front wall and two side walls of the modular enclosure. The side panel and corner panel assemblies each include a plurality of molded key pins and key sockets that are positioned for mating engagement to secure the panel assemblies in strict alignment when adjacently positioned in the anchor channels. A door frame assembly fits into the open rear end of the modular enclosure. A pop-up canopy assembly is installed over the top of the modular enclosure to provide additional head room during use. Alternatively, a non-extendable rooftop may be installed. Two lengths of a gird belt are attached to the door frame assembly, and the two free ends are routed forward along horizontal gird belted channels molded in the exterior surface of each of the side and corner panel assemblies. The free ends of the gird belt are cinchably joined at the front end of the modular enclosure to secure the side and corner panel assemblies in their assembled positions.

BRIEF DESCRIPTION OF THE DRAWINGS

FIG. 4 is an assembly diagram showing the interior side of a pair of top and bottom corner panels and the way in which the bottom corner panel is placed in a corner anchor channel mounted to the floorboard of the modular enclosure.

FIG. 5 is an assembly diagram showing the interior side of a pair of upper and lower side panels and the way in which each of the lower side panels fits in an anchor channel mounted to the floorboard of the modular enclosure.

DESCRIPTION OF THE PREFERRED EMBODIMENT

Figure 1:
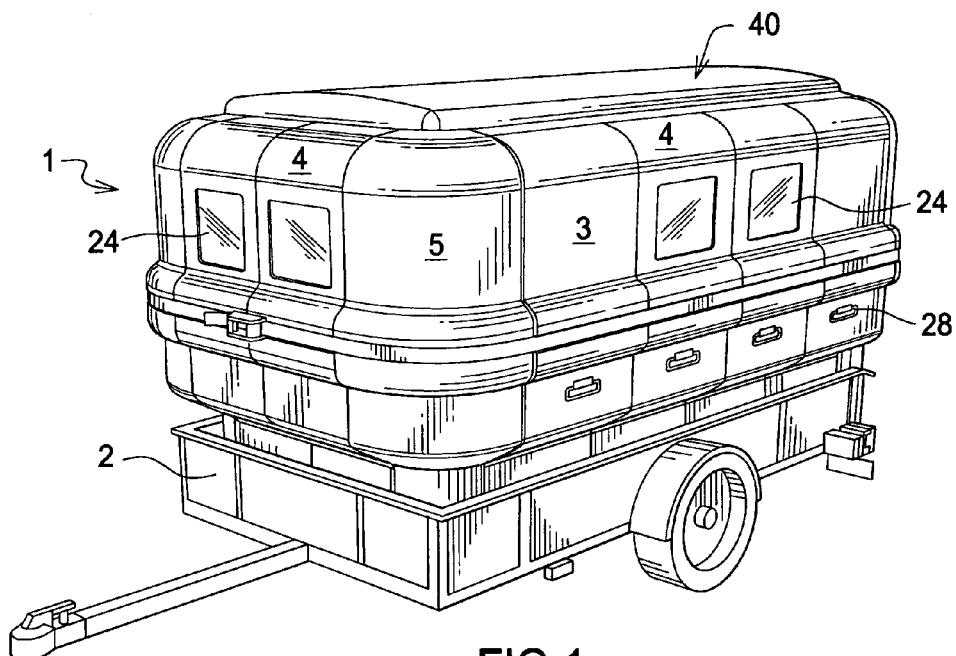
FIG. 1 is a pictorial diagram illustrating the modular enclosure of the present invention mounted on a utility trailer.
Figure 2:
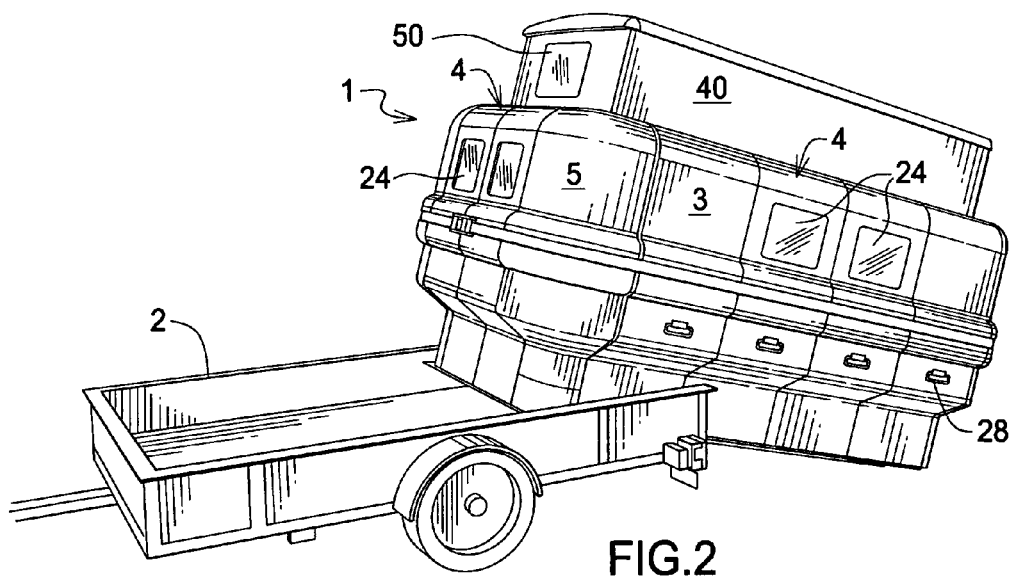
FIG. 2 is a pictorial diagram illustrating the modular enclosure of FIG. 1 with its pop-up top extended and also illustrating an intermediate position of the modular enclosure as it is being loaded onto or removed from the utility trailer.

Referring now to FIG. 1, there is shown a modular enclosure 1, in accordance with the present invention, mounted on a conventional utility trailer 2. FIG. 2 illustrates the intermediate position of modular enclosure 1 as it is being loaded onto or removed from utility trailer 2. Instead of mounting on utility trailer 2, modular enclosure 1 may just as conveniently be mounted on the bed of a pickup truck, the floor of a building, or any other flat surface.

Figure 3:
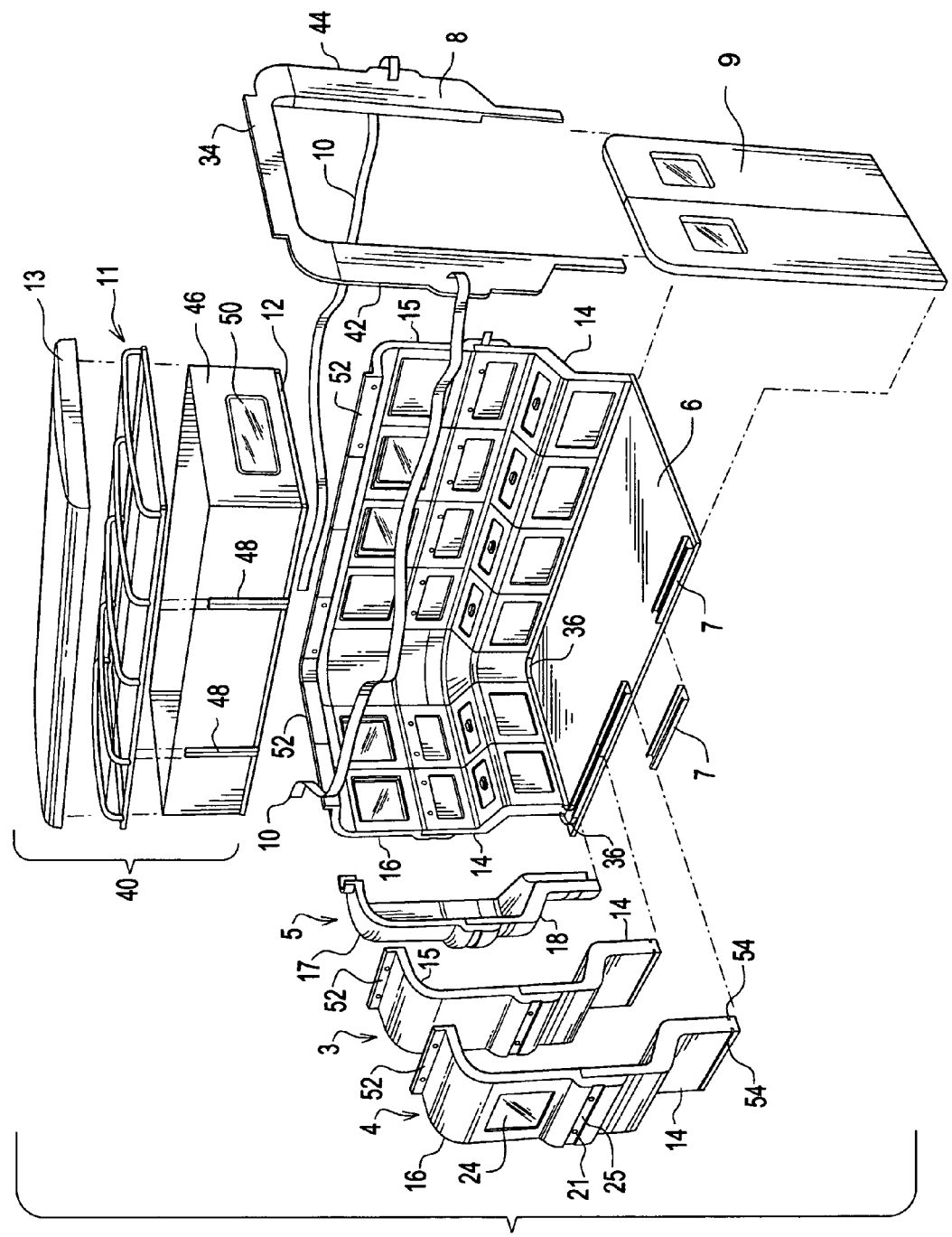
FIG. 3 is a rear perspective exploded view of the modular enclosure of FIG. 1, illustrating representative ones of the modular components that are assembled to form the modular enclosure.
Figure 6:
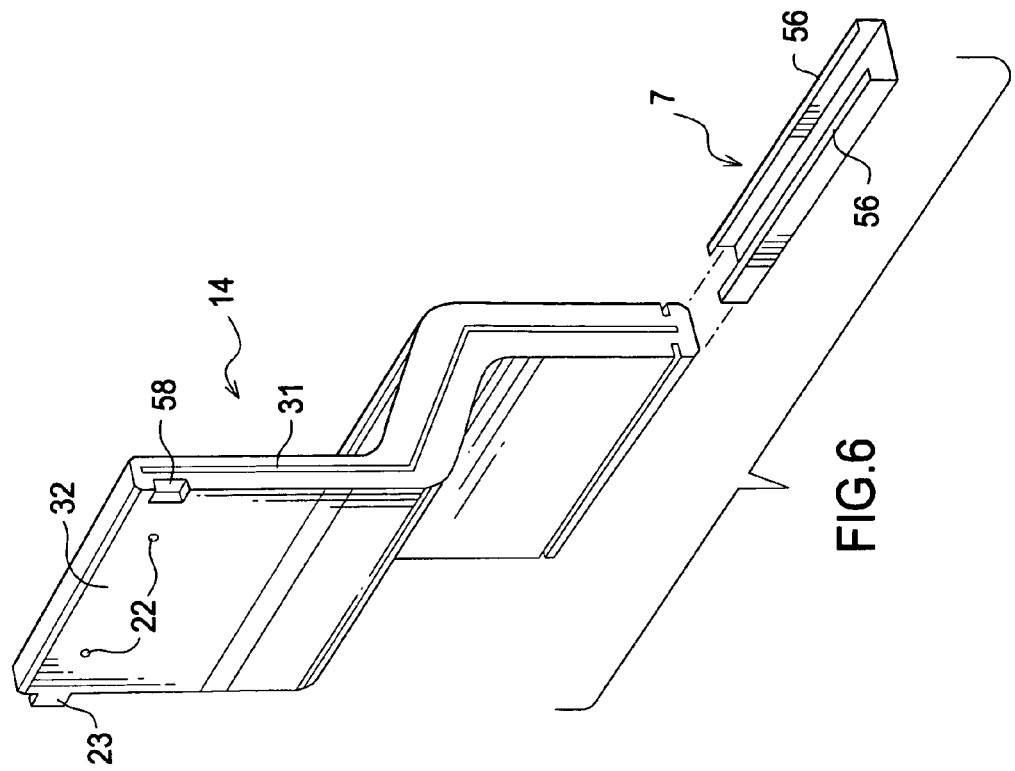
FIG. 6 is an exterior perspective view of the lower side panel of FIG. 5.
Figure 7:
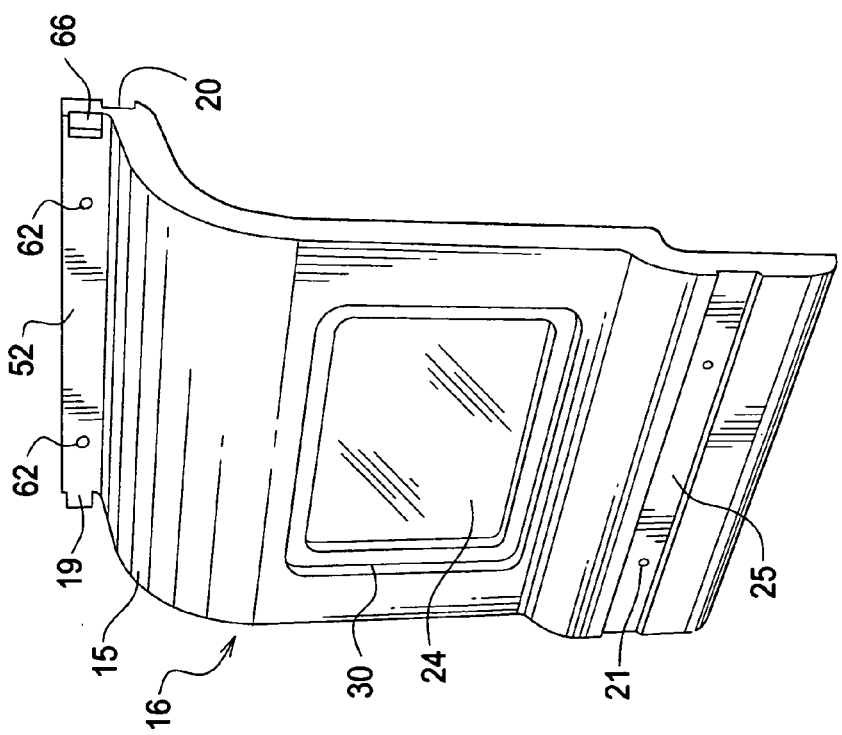
FIG. 7 is an exterior perspective view of the upper side panel of FIG. 5.
Figure 8:
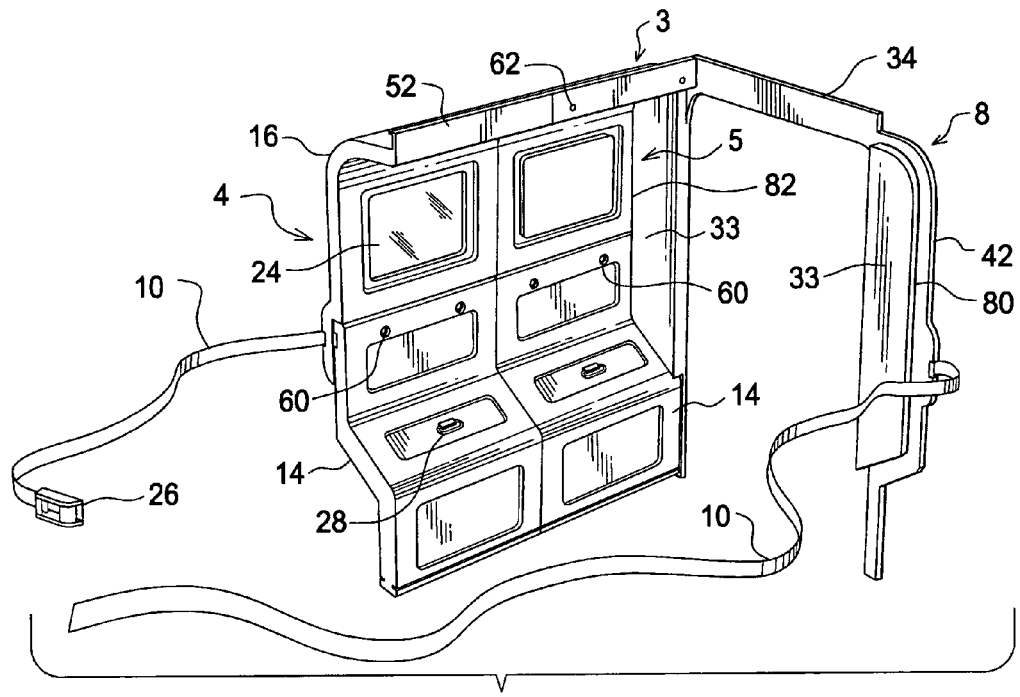
FIG. 8 is a pictorial diagram illustrating connection of the door header and door frame of FIG. 3 and the way in which the gird strap of FIG. 3 is routed around the exterior of the modular enclosure to secure it when fully assembled.

FIG. 3 is an exploded view of the modular components from which modular enclosure 1 is assembled. A plurality of modular opaque side panel assemblies 3 and window side panel assemblies 4, of equal width and height, and two corner panel assemblies 5 are positioned adjacent to each other to form the sides and front of modular enclosure 1. The only difference between opaque side panel assemblies 3 and window side panel assemblies 4 is a conventional manufactured recreational vehicle window 24 mounted in each of window side panel assemblies 4. Side panel assemblies 3, 4 are retained in straight anchor channels 7, whose length is preferably equal to the width of each of the side panel assemblies 3, 4 and which are bolted or otherwise fixedly mounted along three sides of a floorboard 6. Floorboard 6 may comprise, for example, a sheet of commercially available ½ to ¾-inch plywood or oriented strand board. A 90-degree corner anchor channel 36 is mounted at each of the front corners of floorboard 6 to receive the bottom ends of the two 90-degree corner panel assemblies 5. A doorframe assembly 8 fits into the open rear end of modular enclosure 1. Peripheral edges 42, 44 of the left and right flanges of doorframe assembly 8 are shaped to match the contour of the exterior surface of the side panel assemblies 3, 4. Doorframe assembly 8 includes a pair of doors 9 mounted thereto by means of conventional door hinges to provide access to the interior of modular enclosure 1.

A pop-up canopy assembly 40, consisting of an upper canopy frame 11, an upper canopy cover 13, a lower canopy frame 12, and a lower canopy cover 46, is attached to a top rim of the modular enclosure 1. Upper canopy frame 11, which may be constructed of aluminum tubing, is rectangular in shape and includes a plurality of bow-shaped members connected between the longer sides thereof. Upper canopy cover 13, which may comprise a conventional weatherproof fabric material, is stretched over upper canopy frame 11 and secured to the sides and ends of upper canopy frame 11 by means of conventional snap fasteners or mating hook and loop strips, for example. Lower canopy frame 12, like upper canopy frame 11, is also preferably constructed of aluminum tubing and is also rectangular in shape. Lower canopy frame 12 is sized to fit just outside the top rim of modular enclosure 1 formed by a lip 52 that is molded along the upper extremity of each of the adjacently-positioned modular side and corner panel assemblies 3, 4, 5. Lower canopy frame 12 is attached to lip 52 of each of the modular side and corner panel assemblies 3, 4, 5 by any conventional means, such as bolts and rivnuts, for example. Lower canopy frame 12 is connected to upper canopy frame 11 by means of a pair of side supports 48 that are hingedly attached between the sides of upper canopy frame 11 and lower canopy frame 12. Side supports 48 also preferably include a knee joint intermediate the length thereof to permit upper canopy frame 11 to be raised and lowered with respect to lower canopy frame 12. A lower canopy cover 46, which may comprise a conventional fabric material like that of upper canopy cover 13, is attached between the side and end members of upper and lower canopy frames 11, 12 by means similar to that employed to attach upper canopy cover 13 to upper canopy frame 11. One or more windows 50, fabricated of a conventional flexible translucent material, may be provided in lower canopy cover 46. The tubular sides and ends of upper canopy frame 11 are preferably constructed to be slightly longer than the corresponding tubular sides and ends of lower canopy frame 12 so that the tubular sides and ends of upper canopy frame 11 will lie outside the corresponding tubular sides and ends of lower canopy frame 12 when pop-up canopy assembly 40 is retracted from its raised position illustrated in FIG. 2 to the position illustrated in FIG. 1. It will be appreciated that pop-up canopy assembly 40 may comprise any of a number of alternative pop-up assemblies conventionally employed in the recreational vehicle industry. It should also be noted that pop-up canopy assembly 40 may be replaced by a non-extendable roof that may consist of a fixed frame member such as upper canopy frame 11 covered with a fabric material like upper canopy cover 13, for example.

Referring now collectively to FIGS. 3-8, modular lower side panels 14, opaque upper side panel 15, window upper side panel 16, upper corner panel 17, and lower corner panel 18 are formed to have a general overall length and width of approximately two feet and a thickness of two to three inches. These general dimensions result in modular enclosure 1 being about four to five feet in height. Other dimensions may be chosen, as desired. The modular side and corner panels 14, 15, 16, 17, 18 are each fabricated to have a durable plastic skin or shell that may typically comprise polyethylene or ABS approximately ⅛-inch thick serving to encapsulate a urethane foam interior. The shells of modular side and corner panels 14, 15, 16, 17, 18 are formed by conventional plastic thermoforming or rotational molding processes, although the shells may as well be formed of fiberglass, wood, or aluminum, if desired. Following formation of the shell of each of the modular side and corner panels 14, 15, 16, 17, 18, an expanding urethane foam is injected into the shell, filling it completely, to form a rigid panel.

Each of the lower side panels 14 is formed to have a lower vertical section of approximately twelve inches in height to provide clearance for typical side rails and wheel wells of trailers and pickup trucks on which modular enclosure 1 is mounted. At the top of the lower vertical section of each of lower side panels 14, a middle section protrudes outwardly approximately twelve inches in horizontal distance at an angle of approximately forty-five degrees to permit the assembled modular enclosure 1 to overhang the side rail of trailer 2 or a pickup truck on which it is mounted. An upper section of each of the lower side panels 14 extends vertically approximately twelve inches above the middle section.

Each of the upper side panels 15, 16 is formed to have a lower vertical section approximately eight inches in height extending across its entire width and stepped horizontally outwardly a uniform distance equal to the thickness of the upper vertical section of each of the lower side panels 14. An inner surface 32 of the lower vertical section of each of the upper side panels 15, 16 thus overlaps the exterior surface of the upper vertical section of an associated one of the lower side panels 14 to support each of the upper side panels 15, 16 when they are assembled and to shed any water that may be directed to the exterior of modular enclosure 1. The upper one-third, approximately, of each of the upper side panels 15, 16 is curved inwardly ninety degrees to terminate in lip 52, the inner surface of which is in approximate vertical alignment with the interior surface of the lower vertical section of each of the lower side panels 14.

Each of the upper and lower corner panels 17, 18 is formed to have the same profile as upper and lower side panels 16, 14, respectively, except that the profile of upper and lower corner panels 17, 18 is drawn around a ninety-degree arc.

Each of the upper window side panels 16 is joined to one of the lower side panels 14, as illustrated in FIG. 5, to form a window side panel assembly 4. Each of the upper opaque side panels 15 is joined in the same way to one of the lower side panels 14 to form a blank side panel assembly 3. Each of the upper corner panels 17 is similarly joined to one of the lower corner panels 18 to form a corner panel assembly 5.

Bolt holes 21 are provided in the lower vertical section of each of the upper side panels 15, 16 so as to match bolt holes 22 provided in the upper vertical section of each of the lower side panels 14. Bolts 27 are inserted through bolt holes 21, 22 and are retained by captive nut/washers 60.

As stated above, the only difference between opaque side panel assemblies 3 and window side panel assemblies 4 is a window 24 mounted in the upper vertical section of each of the window side panels 16. Each of the opaque side panels 15 and window side panels 16 includes molded inner and outer window channels 30 that are recessed, in alignment with each other, in the inner and outer panel surfaces. Each of the window channels 30 is recessed approximately ⅓ the thickness of the panel and is sized to correspond with the peripheral dimensions of a typical window commonly used in the recreational vehicle industry. The thickness of the foam panel material remaining between the inner and outer window channels 30 represents approximately ⅓ the thickness of the adjacent foam material. This remaining foam material may be easily cut and removed to accommodate installation of window 24 and thereby transform one of opaque side panels 14 into a window side panel 16.

Each of the opaque and window side panel assemblies 3, 4 and corner panel assemblies 5 is formed to include a mating key and socket arrangement that serves to secure adjacent ones of those panel assemblies in strict alignment with each other when assembled as illustrated in FIGS. 1-3. As detailed in FIGS. 4-7, each of the upper side panels 15, 16 includes molded key pins 19, 64 at one top corner of lip 52 thereof. Mating key pin sockets 66, 20 are molded at the opposite top corner of lip 52 for receiving key pins 19, 64, respectively, of an adjacently-positioned one of upper side panels 15, 16.

Each of the lower side panels 14 includes a single molded key pin 23 at one top corner thereof. A mating key socket 58 is molded at the opposite top corner for receiving key pin 23 of an adjacently-positioned one of lower side panels 14.

Each of the upper corner panels 17 includes molded key pins 68, 70 at one top corner of lip 52 thereof for engaging key pin sockets 66, 20, respectively, of an adjacently-positioned one of the upper side panels 15, 16. Mating key pin sockets 72, 74 are molded at the opposite top corner of lip 52 of each of the upper corner panels 17 for receiving key pins 19, 64, respectively, of an adjacently-positioned one of upper side panels 15, 16.

Each of the lower corner panels 18 includes a single molded key pin 76 at one top corner thereof for engaging key pin socket 58 of an adjacently-positioned one of lower side panels 14. A mating key pin socket 78 is molded at the opposite top corner of lower corner panel 18 for receiving key pin 23 of an adjacently-positioned one of lower side panels 14.

As stated above, the bottom end of each of the side panel assemblies 3, 4 is retained in anchor channel 7 that is attached to floorboard 6. As illustrated in more detail in FIGS. 5 and 6, anchor channel 7 is generally U-shaped with its vertical sides terminating in inwardly-turned flanges 56. The bottom vertical section of each of the lower side panels 14 includes a longitudinal groove 54 in both the interior and exterior surfaces thereof which engage flanges 56 of anchor channel 7 when each of the side panel assemblies 3, 4 is slid into position. Alternatively, flanges 56 may be eliminated from anchor channel 7, and grooves 54 may be eliminated from lower side panel 14. Anchor channels 7 may be lengthened so that only two are required, one along each of the longer sides of floorboard 6.

As stated above in connection with FIG. 3, doorframe assembly 8 fits into the open rear end of modular enclosure 1. Peripheral edges 42, 44 of the left and right flanges of doorframe assembly 8 are shaped to match the contour of the exterior surface of the side panel assemblies 3, 4. With additional reference to FIG. 8, it may be seen that doorframe assembly 8 includes two side frame members 33 and a header 34 that is fitted into the open rear end of modular enclosure 1. Outer peripheral edges 80, 82 of the side frame members 33 are shaped to match the contour of the interior surface of the side panel assemblies 3, 4 above the bottom of the middle section of the lower side panels 14 thereof, to permit side frame members 33 to protrude approximately two inches into modular enclosure 1 from the rear edge surfaces of each of the two side panel assemblies 3, 4 on either side of the open rear end of modular enclosure 1. This arrangement permits the flanges of doorframe assembly 8 behind side frame members 33 to be positioned flush against the rear edge surfaces of each of the two side panel assemblies 3, 4 on either side of the rear end of modular enclosure 1. A header 34 serves to join the two side frame members 33 and forms the top of the opening in doorframe assembly 8. Header 34 can be built in various lengths to accommodate different width of modular enclosure 1. Header 34 and side frame members 33 may be formed using the same plastic molding process used to fabricate the components of side panel assemblies 3, 4 and corner panel assembly 5. Alternatively, header 34 and side frame members may be constructed of wood, aluminum, or some other material.

Referring again generally to FIGS. 1-8, each of the modular upper side panels 15, 16 and upper corner panels 17 includes a gird strap channel 25 molded into the exterior surfaces thereof. Gird strap channel 25 is approximately two inches high and ¼-inch deep and extends horizontally across each of the modular upper side panels 15, 16 and upper corner panels 17 at a uniform height. Gird strap channel 25 is thus sized to receive a gird strap 10, which may comprise two equal lengths of a standard two-inch wide cargo strap commonly used to secure loads on trucks and trailers. Rear ends of each of the two lengths of gird strap 10 are bolted or otherwise securely attached to respective ones of the side frame members 33. The two lengths of gird strap 10 are routed in gird strap channel 25 of all of the modular panel assemblies 3, 4, 5 to thereby encircle the exterior of modular enclosure 1 after assembly. A ratchet or other tensioning device 26 serves to join the free ends of the lengths of gird strap 10 and to cinch it tightly around modular enclosure 1, thereby securing all of the modular side and corner panel assemblies 3, 4, 5 in place adjacent each other. Cinching of gird strap 10 also serves to compress a strip 31 of conventional weatherproofing material that has been previously applied along the entire generally vertical length of one side of each of the modular side panel assemblies 3, 4, thereby providing a weather tight seal between them.

A plurality of conventional tie down rings 28 are preferably positioned on the exterior surface of lower sections of selected ones of the modular side and corner panel assemblies 3, 4, 5 to serve as attachment points for tie down straps or ropes that are used to secure modular enclosure 1 to trailer 2 or other vehicle on which it is mounted. An additional tie down ring 28 is positioned on the interior surface of modular enclosure 1 opposite each one of the exterior tie down rings 28. Each pair of opposing exterior and interior tie down rings 28 is connected by a bolt that passes through the panel on which they are mounted. The interior tie down rings 28 serve as attachment points for securing any cargo or furnishings transported within the modular enclosure 1.

Figure 9:
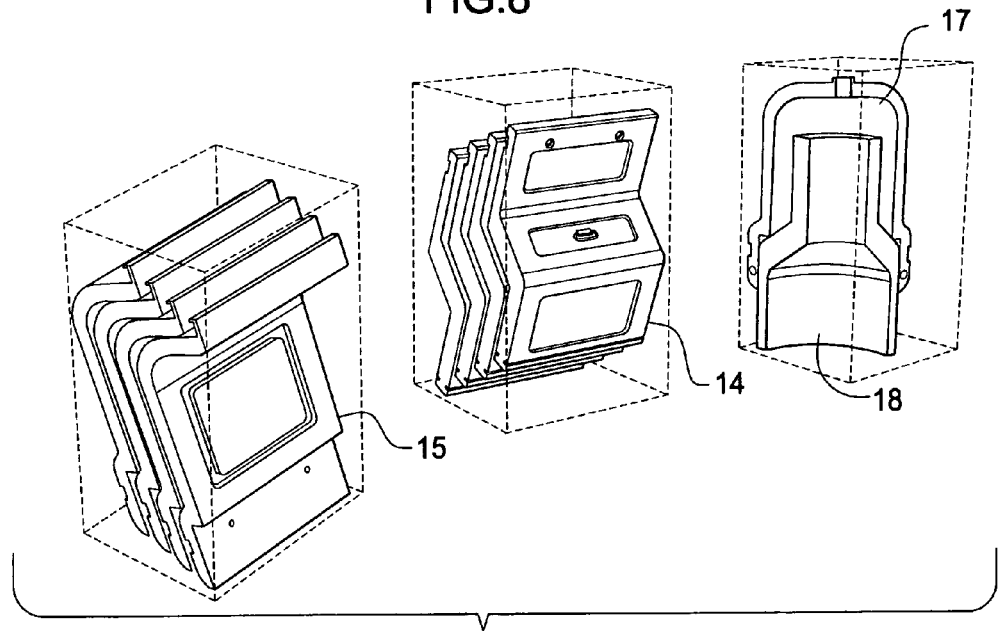
FIG. 9 is a series of pictorial diagrams illustrating how the lower side panels, upper side panels, and corner panels may be efficiently nested and packaged for compact storage or shipment.

Referring now to FIG. 9, it will be appreciated that the construction, detailed above, of each of the modular side panels and corner panels 14, 15, 17, 18 enables them to be compactly stacked or nested together for storage or for shipping in containers such as those shown in phantom. Due to light weight construction of the panels, packages thereof can be economically shipped by common light package carriers.

As will be recognized from the foregoing detailed description and the appended drawings, modular enclosure 1 is advantageous in that it may be quickly and easily assembled or disassembled using only a minimum number of simple hand tools. Assembly begins with laying a floorboard 6 of appropriate size on a flat surface such as the bed of utility trailer 2. The size of floorboard 6 determines the size of modular enclosure 1 and is typically 4 feet by 8 feet, 5 feet by 8 feet, or 5 feet by 10 feet. Anchor channels 7 are then attached in abutting positions to floorboard 6 along the three edges thereof that will define the front wall and side walls of the modular enclosure 1. Each of the upper side panels 15, 16 is attached to a lower side panel 14 by means of bolts 27, as illustrated in FIG. 5. Each of the two pairs of upper and lower corner panels is similarly connected. The completed side panel assemblies 3, 4 and corner panel assemblies 5 are then oriented upright and positioned in respective ones of the straight anchor channels 7 and corner anchor channels 36, working from the front to the open rear end of modular enclosure 1. Each of the side panel assemblies 3, 4 is first positioned in anchor channel 7 and then moved laterally to engage its key pins 19, 64, 23 with key pin sockets 66, 20, 58, respectively, of an adjacent one of side panel assemblies 3, 4; to engage its key pins 19, 64, 23 with key pin sockets 72, 74, 78, respectively, of an adjacent one of corner panel assemblies 5; or to engage its key pin sockets 66, 20, 58 with key pins 68, 70, 76, respectively, of an adjacent one of corner panel assemblies 5. After all of the side and corner panel assemblies 3, 4, 5 have been positioned, doorframe assembly 8 is fit into the open rear end of modular enclosure 1, with the two attached lengths of gird strap 10 laid to the outside. The two lengths of gird strap 10 are then routed along the exterior of modular enclosure 1, within the gird strap channels 25. Tensioning device 26 is then employed to connect the free ends of gird strap 10 and tighten it, thereby securing the side and corner panel assemblies 3, 4, 5 in place and compressing the weatherproof strip 31 between them. Pop-up canopy assembly 40 or some other roof of the user's choice is then attached to the top of modular enclosure 1. One end of a conventional tie down strap is inserted into one of the tie down rings 28 provided on the exterior of modular enclosure 1, and the other end is attached to a structural member of trailer 2 or other vehicle. Generally, four to six evenly-spaced tie down straps are required to safely secure modular enclosure 1.

I claim:

1. A modular enclosure that may be user-assembled on a utility trailer, pickup truck, or a flat surface, the modular enclosure comprising:
   a plurality of side panels selectively positioned in interlocking engagement with each other to form parallel left and right side walls of equal length and a front wall of said modular enclosure;
   two 90-degree corner panels, one of which is positioned to interlockingly join said left side wall to said front wall and the other of which is positioned to interlockingly join said right side wall to said front wall;
   a doorframe assembly positioned in a rear opening of said modular enclosure, said doorframe assembly comprising left and right doorframe flange members each having an outwardly facing edge shaped in correspondence with a contour of an exterior surface of each of said side panels; a header member positioned horizontally between said left and right doorframe flange members at top ends thereof; left and right side frame members mounted to an inner surface of said left and right doorframe flange members, said left and right side frame members each having an outwardly facing edge shaped in correspondence with a contour of an interior surface of each of said side panels, said left and right side frame members protruding into said rear opening of said modular enclosure a distance equal to a thickness of said side frame members such that an inner surface of said left and right doorframe flange members that lies beyond said outwardly facing edge of each of said side frame members is positioned flush against a rear edge surface of rearward most ones of said side panels forming said left and right side walls when said modular enclosure is in said assembled configuration; and one or more doors hingedly attached to a selected one or both of said left and right side frame members;
   a floorboard for supporting said side panels, corner panels, and doorframe assembly in an assembled configuration of said modular enclosure;
   a gird strap connected to said door frame assembly and routed forward to encircle said modular enclosure; and
   tensioning means connected to said gird strap for cinching said gird strap to thereby secure said side panels, said corner panels, and said door frame assembly in said assembled configuration of said modular enclosure.

2. A modular enclosure as in claim 1, further comprising:
   a top rim formed at an upper terminus of each of said side panels, said corner panels, and said doorframe assembly; and
   a roof assembly positioned over said top rim to thereby cover said modular enclosure.

3. A modular enclosure as in claim 2, wherein said roof assembly comprises a pop-up canopy adjustable between a retracted aerodynamic position and an upwardly extended position that provides additional headroom within said modular enclosure when in use.

4. A modular enclosure as in claim 1, further comprising a plurality of anchor channels mounted end to end to said floorboard proximate front and side edges thereof, each of said anchor channels having a U-shape opening upwardly for securely receiving bottom ends of respective ones of said side and corner panels.

5. A modular enclosure as in claim 4, wherein:
   each of said anchor channels receiving said side panels is formed to include opposing flanges along opposite top edges thereof, and
   each of said side panels includes inner and outer horizontal grooves on inner and outer surfaces thereof, proximate said bottom ends thereof, said horizontal grooves extending along the entirety of a width of each of said side panels, said horizontal grooves of each of said side panels being located to matingly engage said flanges of an associated one of said anchor channels to thereby secure each of said side panels.

6. A modular enclosure as in claim 1, wherein each of said side and corner panels comprises a urethane foam interior and an exterior molded plastic shell encapsulating said urethane foam interior.

7. A modular enclosure as in claim 6, further comprising a plurality of protruding key pins molded along one side of each of said side and corner panels and a like plurality of mating key sockets molded along an opposite side of each of said side and corner panels to provide interlocking engagement of said side and corner panels in said assembled configuration of said modular enclosure.

8. A modular enclosure as in claim 1, further comprising a plurality of protruding key pins located along one side of each of said side and corner panels and a like plurality of mating key sockets located along an opposite side of each of said side and corner panels to provide interlocking engagement of said side and corner panels in said assembled configuration of said modular enclosure.

9. A modular enclosure as in claim 1, further comprising a horizontal gird strap channel formed at a uniform height and extending along the entirety of a width of each of said side and corner panels, said gird strap channel serving to receive said gird strap encircling said modular enclosure in said assembled configuration.

10. A modular enclosure as in claim 1, wherein said side panels are uniform in width, height, and shape.

11. A modular enclosure as in claim 1, wherein interior and exterior shaped surfaces of each of said corner panels have a uniform lateral curvature that subtends a 90-degree arc.

12. A modular enclosure as in claim 1, further comprising a plurality of tie down devices mounted on an exterior surface of selected ones of said side and corner panels, said tie down devices providing attachment points for securing said modular enclosure to a vehicle on which it is mounted.

13. A modular enclosure as in claim 1, further comprising a window mounted in a selected one or more of said side panels.

14. A modular enclosure as in claim 1, wherein each of said side and corner panels is shaped for being nested closely together for compact storage and shipment.

15. A modular enclosure as in claim 1, further comprising a strip of weatherproofing material attached along the entirety of a selected edge surface of each of said side and corner panels, said strip of weatherproofing material being compressed when said gird strap is cinched to thereby render said modular enclosure weather tight.

16. A modular enclosure as in claim 1, wherein each of said side panels comprises:
 a vertical lower section;
 an outwardly-angled middle section; and
 a vertical upper section, an upper portion of said vertical upper section curving inwardly ninety degrees and terminating in a vertical top rim, an interior surface of said vertical top rim being in vertical alignment with an interior surface of said vertical lower section of each of said side panels.

17. A modular enclosure as in claim 1, wherein:
 each of said side panels comprises an upper side panel and a lower side panel, each of said upper side panels having an overlap section at a bottom end thereof overlapping an exterior surface of an upper section of an associated one of said lower side panels, said upper and lower side panels being connected to each other at said overlap section; and
 each of said corner panels comprises an upper corner panel and a lower corner panel, each of said upper corner panels having an overlap section at a bottom end thereof overlapping an exterior surface of an upper section of an associated one of said lower corner panels, said upper and lower corner panels being connected to each other at said overlap section.

* * * * *